(12) United States Patent
Himeno et al.

(10) Patent No.: US 9,209,656 B2
(45) Date of Patent: Dec. 8, 2015

(54) BRUSHLESS MOTOR AND DISK DRIVE APPARATUS

(71) Applicant: NIDEC CORPORATION, Kyoto (JP)

(72) Inventors: Toshikazu Himeno, Kyoto (JP); Hongbing Du, Singapore (SG); Junichi Hashimoto, Kyoto (JP); Kazuya Enokizono, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 318 days.

(21) Appl. No.: 13/867,505

(22) Filed: Apr. 22, 2013

(65) Prior Publication Data

US 2013/0313935 A1    Nov. 28, 2013

Related U.S. Application Data

(60) Provisional application No. 61/650,410, filed on May 22, 2012, provisional application No. 61/650,235, filed on May 22, 2012.

(51) Int. Cl.
| | |
|---|---|
| *H02K 21/12* | (2006.01) |
| *H02K 1/27* | (2006.01) |
| *H02K 21/24* | (2006.01) |
| *H02K 15/03* | (2006.01) |
| H02K 3/26 | (2006.01) |
| H02K 5/167 | (2006.01) |

(52) U.S. Cl.
CPC .............. *H02K 1/2793* (2013.01); *H02K 15/03* (2013.01); *H02K 21/24* (2013.01); *H02K 3/26* (2013.01); *H02K 5/1677* (2013.01)

(58) Field of Classification Search
USPC ......... 310/156.12, 156.21, 156.32, 268, 67 R
See application file for complete search history.

(56) References Cited

U.S. PATENT DOCUMENTS

| | | | | |
|---|---|---|---|---|
| 4,336,475 A | | 6/1982 | Morinaga et al. | |
| 4,626,727 A | * | 12/1986 | Janson | ............... 310/156.32 |
| 5,446,325 A | * | 8/1995 | Iwabuchi | ............... 310/67 R |

(Continued)

FOREIGN PATENT DOCUMENTS

| | | |
|---|---|---|
| CN | 101689775 A | 3/2010 |
| CN | 103368347 A | 10/2013 |

(Continued)

OTHER PUBLICATIONS

Himeno et al., U.S. Appl. No. 13/856,055, filed Apr. 3, 2013.

(Continued)

*Primary Examiner* — Thanh Lam

(74) *Attorney, Agent, or Firm* — Western, Hattori, Daniels & Adrian, LLP

(57) ABSTRACT

A brushless motor includes a stationary unit and a rotary unit rotatably supported with respect to the stationary unit. The stationary unit includes an armature and a base member arranged to support the armature. The rotary unit includes a magnet, a hub made of a magnetic material and a rotor yoke made of a magnetic material. The armature includes a plurality of coil patterns arranged along a circumferential direction. The hub includes an inner lower surface, an outer lower surface and a recess portion. The recess portion is arranged between the inner lower surface and the outer lower surface and depressed upward. At least a portion of the magnet is accommodated within the recess portion. At least one of the inner lower surface and the outer lower surface is positioned above a lower surface of the magnet.

14 Claims, 12 Drawing Sheets

(56) References Cited

U.S. PATENT DOCUMENTS

| | | | |
|---|---|---|---|
| 5,587,617 A | 12/1996 | Dunfield et al. | |
| 5,598,048 A | 1/1997 | Dunfield et al. | |
| 5,751,085 A * | 5/1998 | Hayashi | 310/90 |
| 5,796,193 A | 8/1998 | Sakano et al. | |
| 6,172,442 B1 * | 1/2001 | Jun | 310/268 |
| 6,445,096 B1 * | 9/2002 | Saito et al. | 310/67 R |
| 6,512,315 B1 * | 1/2003 | Yamaguchi | 310/51 |
| 6,801,388 B2 | 10/2004 | Kayama et al. | |
| 6,828,708 B2 * | 12/2004 | Ito et al. | 310/90 |
| 7,960,884 B2 | 6/2011 | Miyata et al. | |
| 8,176,920 B2 | 5/2012 | Young | |
| 2004/0051407 A1 * | 3/2004 | Nishio | 310/67 R |
| 2009/0072642 A1 | 3/2009 | Miyamori et al. | |
| 2011/0255191 A1 | 10/2011 | Watanabe et al. | |
| 2013/0258522 A1 | 10/2013 | Himeno et al. | |

FOREIGN PATENT DOCUMENTS

| | | |
|---|---|---|
| CN | 103368350 A | 10/2013 |
| JP | 55-26030 A | 2/1980 |
| JP | 62-25859 A | 2/1987 |
| JP | 63-121462 A | 5/1988 |
| JP | 04-58752 A | 2/1992 |
| JP | 2002-325413 A | 11/2002 |
| JP | 2005-160202 A | 6/2005 |
| JP | 2005-348572 A | 12/2005 |
| JP | 2006-325329 A | 11/2006 |
| JP | 2011-223820 A | 11/2011 |
| SG | 135981 A1 | 10/2007 |
| SG | 193668 A1 | 10/2013 |

OTHER PUBLICATIONS

Sumi et al., U.S. Appl. No. 13/867,860, filed Jan. 31, 2013.

Himeno et al., U.S. Appl. No. 13/780,327, filed Feb. 28, 2013.

Himeno et al., Singapore Patent Application No. 201202345-3; filed on Mar. 30, 2012.

* cited by examiner

BRUSHLESS MOTOR AND DISK DRIVE APPARATUS

BACKGROUND OF THE INVENTION

1. Field of the Invention

The present invention relates to a brushless motor and a disk drive apparatus.

2. Description of the Related Art

A hard disk apparatus is equipped with a brushless motor for rotating a disk. A conventional brushless motor is disclosed in, e.g., SG135981. A permanent-magnet synchronous motor of SG185981 includes a permanent magnet mounted to at least one of a top yoke and a bottom yoke and an armature arranged within an air gap between the permanent magnet and the other yoke (see claim 1).

Referring to FIG. 4 of SG135981, a yoke is attached to a rotor shell. A permanent magnet is attached to the yoke. In this structure, the yoke is interposed between the rotor shell and the permanent magnet. For this reason, it becomes difficult to reduce the axial thickness of the motor. In an effort to make the motor thinner, there is provided, e.g., a structure in which a rotor shell is made of a magnetic material and in which a permanent magnet is accommodated in a recess portion formed on the lower surface of the rotor shell.

However, if the permanent magnet is accommodated in the recess portion arranged on the lower surface of the rotor shell, magnetic fluxes are apt to flow from the permanent magnet toward the lower surface of the rotor shell positioned radially inward or radially outward of the permanent magnet. In this case, the amount of magnetic fluxes flowing from the permanent magnet toward an armature is decreased.

SUMMARY OF THE INVENTION

A brushless motor according to one illustrative embodiment of the subject application includes a stationary unit and a rotary unit rotatably supported with respect to the stationary unit. The stationary unit includes an armature and a base member arranged to support the armature. The armature has a flat shape and extends in a direction orthogonal to a center axis extending in an up-down direction. The rotary unit includes a magnet, a hub made of a magnetic material and a rotor yoke made of a magnetic material. The magnet is positioned above the armature. The hub is arranged to hold the magnet. The rotor yoke is provided with a portion positioned below the armature. The armature includes a plurality of coil patterns arranged along a circumferential direction. The hub includes an inner lower surface, an outer lower surface and a recess portion. The inner lower surface is positioned radially inward of the magnet. The outer lower surface is positioned radially outward of the magnet. The recess portion is arranged between the inner lower surface and the outer lower surface and is depressed upward. At least a portion of the magnet is accommodated within the recess portion. At least one of the inner lower surface and the outer lower surface is positioned above a lower surface of the magnet.

According to one illustrative embodiment of the subject application, at least a portion of the magnet is accommodated within the recess portion. This helps reduce the axial dimension of the brushless motor. Moreover, at least one of the inner lower surface and the outer lower surface is positioned above the lower surface of the magnet. This makes it difficult for the magnetic fluxes to flow from the magnet toward the inner lower surface or the outer lower surface. As a result, the magnetic fluxes can efficiently flow from the magnet toward the armature.

A brushless motor according to another illustrative embodiment of the subject application includes a stationary unit and a rotary unit rotatably supported with respect to the stationary unit. The stationary unit includes an armature and a base member arranged to support the armature. The armature has a flat shape and extends in a direction orthogonal to a center axis extending in an up-down direction. The rotary unit includes a magnet, a hub made of a magnetic material and a rotor yoke made of a magnetic material. The magnet is positioned above the armature. The hub is arranged to hold the magnet. The rotor yoke is provided with a portion positioned below the armature. The armature includes a plurality of coil patterns arranged along a circumferential direction. The hub includes a lower surface and a recess portion depressed upward from the lower surface. At least a portion of the magnet is accommodated within the recess portion. The recess portion includes an inner side surface and an outer side surface. The inner side surface is positioned radially inward of the magnet. The outer side surface is positioned radially outward of the magnet. A radial gap exists in at least one of a space between a radial inner end surface of the magnet and the inner side surface and a space between a radial outer end surface of the magnet and the outer side surface.

According to another illustrative embodiment of the subject application, at least a portion of the magnet is accommodated within the recess portion. This helps restrain the axial dimension of the brushless motor from becoming larger. Moreover, a radial gap exists in at least one of a space between a radial inner end surface of the magnet and the inner side surface and a space between a radial outer end surface of the magnet and the outer side surface. This makes it difficult for the magnetic fluxes to flow from the magnet toward at least one of the inner side surface and the outer side surface. As a result, the magnetic fluxes can efficiently flow from the magnet toward the armature.

The above and other elements, features, steps, characteristics and advantages of the present invention will become more apparent from the following detailed description of the preferred embodiments of the present invention with reference to the attached drawings.

DETAILED DESCRIPTION OF THE PREFERRED EMBODIMENTS

Hereinafter, illustrative embodiments of the present invention will now be described with reference to the accompanying drawings which form a part hereof. In the following description, the direction parallel to the center axis of a brushless motor will be referred to as "axial". The direction orthogonal to the center axis of the brushless motor will be referred to as "radial". The direction extending along an arc about the center axis of the brushless motor will be referred to as "circumferential". In the following description, the shape and positional relationship of the respective portions will be described under the assumption that the axial direction extends in an up-down direction and that the side of a magnet with respect to an armature is an upper side. However, such definition of the up-down direction is not intended to limit the in-use direction of the brushless motor and the disk drive apparatus according to the present invention.

In the following description, the term "parallel" is intended to include a substantially parallel direction. Likewise, the term "orthogonal" is intended to include a substantially orthogonal direction.

Figure 1:
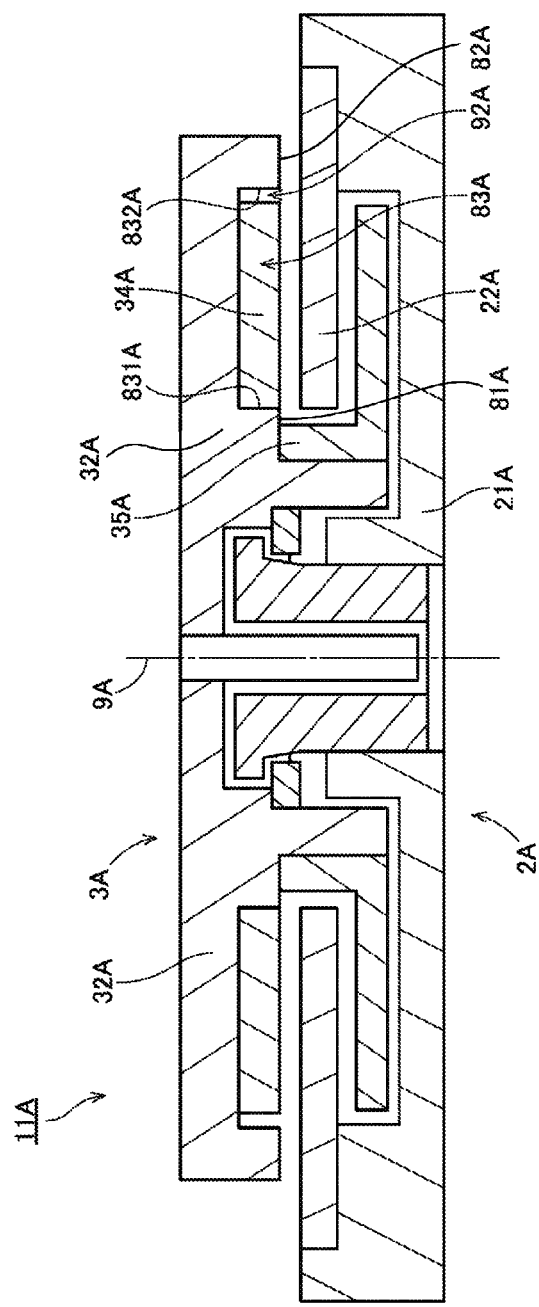
FIG. 1 is a vertical section view showing a brushless motor according to a first preferred embodiment.

FIG. 1 is a vertical section view showing a brushless motor 11A according to a first preferred embodiment. As shown in FIG. 1, the brushless motor 11A preferably includes a stationary unit 2A and a rotary unit 3A. The rotary unit 3A is rotatably supported with respect to the stationary unit 2A.

The stationary unit 2A preferably includes a base member 21A and an armature 22A. The base member 21A is arranged to support the armature 22A. The armature 22A extends in a flat shape in the direction orthogonal to a center axis 9A. The armature 22A includes a plurality of coil patterns arranged along a circumferential direction. The rotary unit 3A preferably includes a hub 32A made of a magnetic material, a magnet 34A and a rotor yoke 35A made of a magnetic material. The magnet 34A is positioned above the armature 22A. The magnet 34A is held by the hub 32A. The rotor yoke 35A has a portion positioned below the armature 22A.

As shown in FIG. 1, the lower surface of the hub 32A preferably includes an inner lower surface 81A, an outer lower surface 82A and a recess portion 83A. The inner lower surface 81A is positioned radially inward of the magnet 34A. The outer lower surface 82A is positioned radially outward of the magnet 34A. The recess portion 83A is arranged between the inner lower surface 81A and the outer lower surface 82A and is depressed upward. At least a portion of the magnet 34A is accommodated within the recess portion 83A. Thus, the axial dimension of the brushless motor 11A is restrained from becoming larger.

In the present embodiment, the inner lower surface 81A and the outer lower surface 82A are positioned above the lower surface of the magnet 34A. This makes it difficult for magnetic fluxes to flow from the magnet 34A toward the inner lower surface 81A and the outer lower surface 82A. As a result, it becomes easier for the magnetic fluxes to efficiently flow from the magnet 34A toward the armature 22A. Only one of the inner lower surface and the outer lower surface may be arranged above the lower surface of the magnet.

The recess portion 83A preferably includes an inner side surface 831A and an outer side surface 832A. The inner side surface 831A is positioned radially inward of the magnet 34A. The outer side surface 832A is positioned radially outward of the magnet 34A. In the present embodiment, as shown in FIG. 1, a radial gap 92A exists between the radial outer end surface of the magnet 34A and the outer side surface 832A. This makes it difficult for the magnetic fluxes to flow from the magnet 34A toward the outer side surface 832A. As a result, the magnetic fluxes can efficiently flow from the magnet 34A toward the armature 22A. A radial gap may exist between the radial inner end surface of the magnet and the inner side surface. In this case, it becomes difficult for the magnetic fluxes to flow from the magnet toward the inner side surface.

Figure 2:
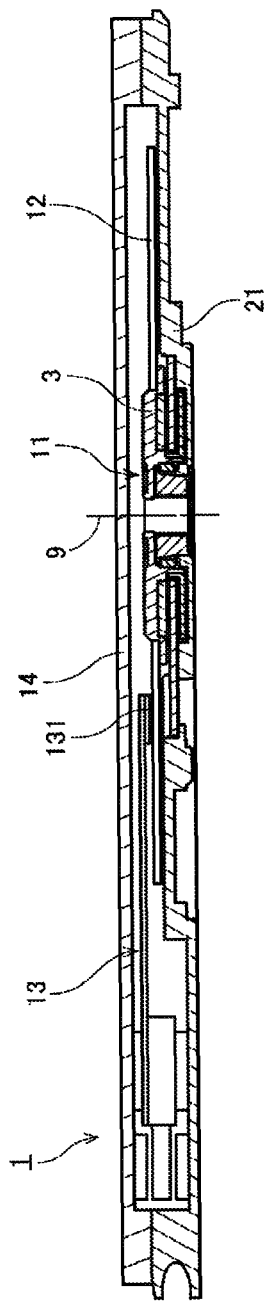
FIG. 2 is a vertical section view showing a disk drive apparatus according to a second preferred embodiment.

FIG. 2 is a vertical section view showing a disk drive apparatus 1 according to a second preferred embodiment. The disk drive apparatus 1 is an apparatus for performing information reading and writing tasks with respect to a magnetic disk 12 while rotating the magnetic disk 12. As shown in FIG. 2, the disk drive apparatus 1 preferably includes a brushless motor 11, a magnetic disk 12, an access unit 13 and a cover 14.

The brushless motor 11 supports the magnetic disk 12 and rotates the magnetic disk 12 about the center axis 9. The brushless motor 11 preferably includes a base member 21 extending radially at the lower side of the magnetic disk 12. The rotary unit 3 of the brushless motor 11, the magnetic disk 12 and the access unit 13 are accommodated within a housing. The housing is made up of the base member 21 and the cover 14. The access unit 13 displaces a head 131 along the recording surface of the magnetic disk 12. This enables the access unit 13 to perform information reading and writing tasks with respect to the magnetic disk 12.

The disk drive apparatus 1 may include two or more magnetic disks 12. The access unit 13 may perform only one of the information reading and writing tasks with respect to the magnetic disk 12.

Figure 3:
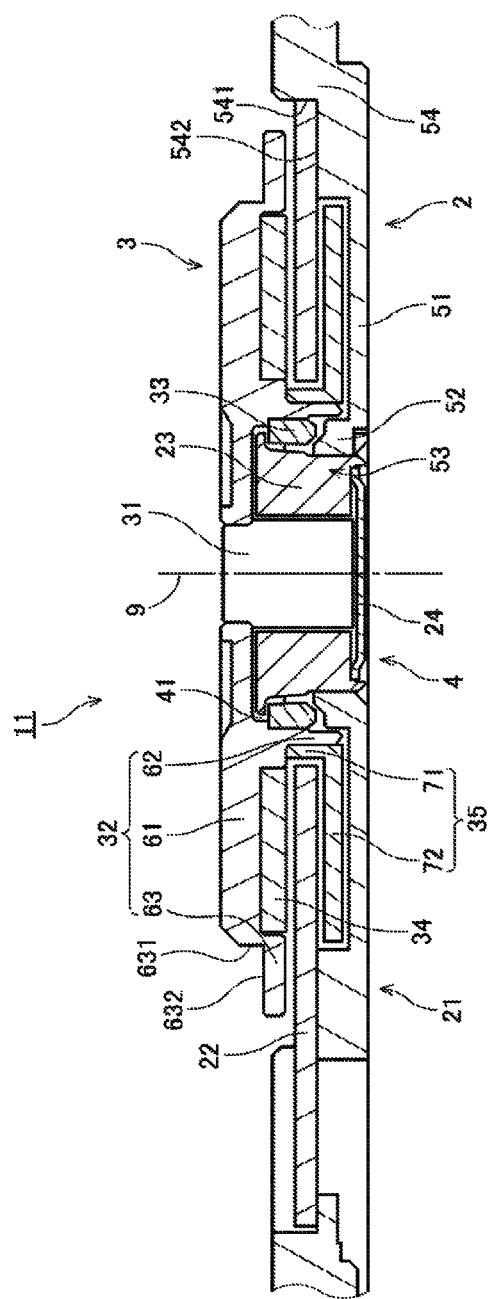
FIG. 3 is a vertical section view showing a brushless motor according to the second preferred embodiment.
Figure 4:
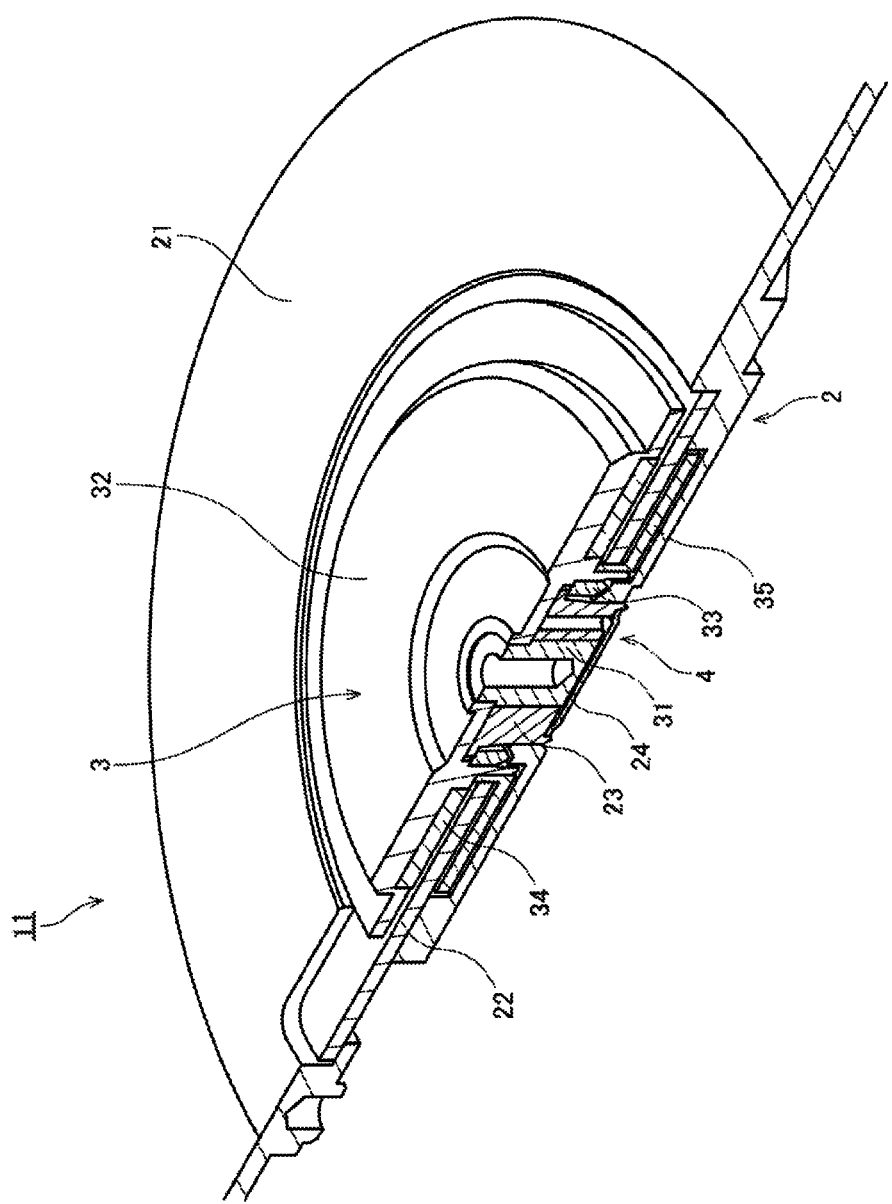
FIG. 4 is a cutaway perspective view of the brushless motor according to the second preferred embodiment.

Next, description will be made on the configuration of the brushless motor 11. FIG. 3 is a vertical section view of the brushless motor 11. FIG. 4 is a cutaway perspective view of the brushless motor 11. As shown in FIGS. 3 and 4, the brushless motor 11 preferably includes a stationary unit 2 and a rotary unit 3. The stationary unit 2 is kept stopped with respect to the base member 21 and the cover 14. The rotary unit 3 is rotatably supported with respect to the stationary unit 2.

The stationary unit 2 of the present embodiment preferably includes a base member 21, an armature 22, a sleeve 23 and a cap 24.

The base member 21 supports the armature 22 and the sleeve 23. The base member 21 is formed by casting metal, e.g., aluminum. As shown in FIG. 3, the base member 21 preferably includes a bottom plate portion 51, a base protrusion portion 52 and an armature holding portion 54.

The bottom plate portion 51 lies below the armature 22 and extends in the direction orthogonal to the center axis 9. The base protrusion portion 52 extends upward from the inner periphery of the bottom plate portion 51 in a substantially cylindrical shape. The base protrusion portion 52 is positioned radially inward of a hub protrusion portion 62 to be described later. A base through-hole 53 axially extending through the base member 21 is arranged radially inward of the base protrusion portion 52.

The armature holding portion 54 lies radially outward of a rotor yoke 35 to be described later and protrudes upward from the bottom plate portion 51. The armature holding portion 54 preferably includes a wall portion 541 and an annular surface 542. The wall portion 541 extends in a substantially cylindrical shape in a coaxial relationship with the center axis 9. The annular surface 542 extends radially inward from the lower end of the wall portion 541. The armature 22 is arranged radially inward of the wall portion 541 and is supported on the annular surface 542.

Figure 5:
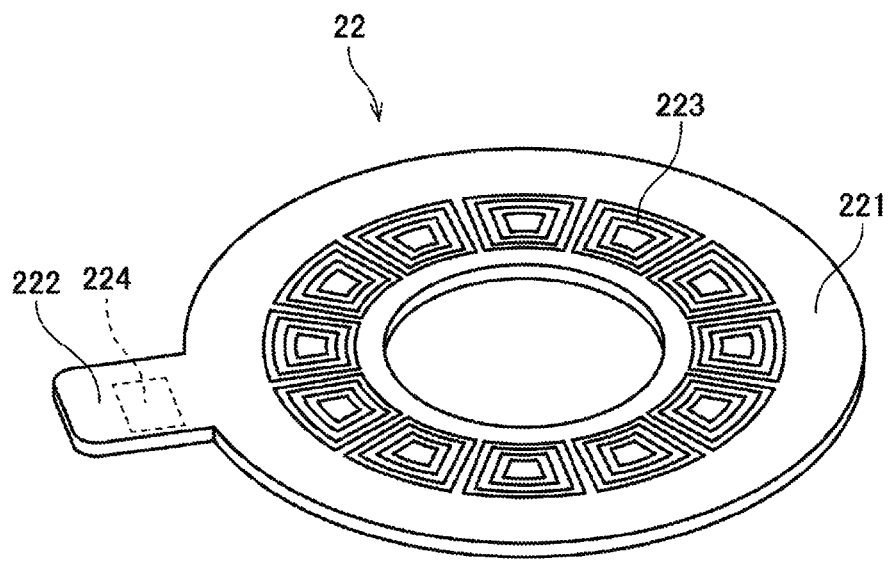
FIG. 5 is a perspective view showing an armature according to the second preferred embodiment.

The armature 22 is a flat circuit board extending in the direction orthogonal to the center axis 9. The armature 22 is arranged radially outward of a bearing mechanism 4, below a magnet 34 to be described later and above a flange portion 72 of a rotor yoke 35 to be described later. FIG. 5 is a perspective view showing the armature 22. As shown in FIG. 5, the armature 22 preferably includes a ring-shaped plate portion 221 and a protruding plate portion 222. The ring-shaped plate portion 221 lies below the hub 32 and the magnet 34 to be described later and extends in an annular shape. The protruding plate portion 222 has a flat shape and protrudes radially outward from a portion of the radial outer edge of the ring-shaped plate portion 221.

An electronic circuit is arranged on the upper or lower surface of the ring-shaped plate portion 221. The electronic circuit preferably includes a plurality of coil patterns 223 arranged along the circumferential direction. For example, each of the coil patterns 223 is arranged in a spiral pattern about a coil axis extending in an axial direction. A power feeding portion 224 is arranged on the lower surface of the protruding plate portion 222. When an electric current is to be fed to the disk drive apparatus 1, a lead wire extending from an external power source is connected to the power feeding portion 224. Then, a drive current is supplied from the lead wire to the coil patterns 223 via the power feeding portion 224.

As shown in FIGS. 3 and 4, the sleeve 23 extends axially in a substantially cylindrical shape around a shaft 31 to be described later. The lower portion of the sleeve 23 is inserted into the base through-hole 53 and is fixed to the inner circumferential surface of the base protrusion portion 52. The inner circumferential surface of the sleeve 23 is radially opposed to the outer circumferential surface of the shaft 31. The lower opening of the sleeve 23 is closed by the cap 24.

The rotary unit 3 of the present embodiment preferably includes a shaft 31, a hub 32, a ring-shaped member 33, a magnet 34 and a rotor yoke 35. The shaft 31 is arranged radially inward of the sleeve 23 and the hub 32 to extend in the axial direction. The shaft 31 is made of metal, e.g., stainless steel. The shaft 31 is supported on the sleeve 23 and the cap 24 through a lubricant 41. The shaft 31 rotates about the center axis 9. Th upper end portion of the shaft 31 protrudes upward beyond the upper surface of the sleeve 23. The shaft 31 and the hub 32 may be a continuously extending member.

The hub 32 preferably includes a top plate portion 61, a hub protrusion portion 62 and a disk support portion 63. The hub 32 is made of a magnetic material. The top plate portion 61 lies above the armature 22 and extends radially and circumferentially. The radial inner edge portion of the top plate portion 61 is fixed to the upper end portion of the shaft 31. The magnet 34 is held on the lower surface of the top plate portion 61. The hub protrusion portion 62 extends downward from the top plate portion 61 in a substantially cylindrical shape.

The disk support portion 63 is arranged radially outward of the top plate portion 61 to support the magnetic disk 12. The disk support portion 63 preferably includes a substantially cylindrical first support surface 631 and a second support surface 632 extending radially outward from the lower end of the first support surface 631. At least a portion of the inner circumferential portion of the magnetic disk 12 makes contact with the first support surface 631. Thus, the magnetic disk 12 is radially located in position. At least a portion of the lower surface of the magnetic disk 12 makes contact with the second support surface 632. Accordingly, the magnetic disk 12 is axially located in position.

The ring-shaped member 33 is a circular ring-shaped member positioned radially inward of the hub protrusion portion 62. The upper surface of the ring-shaped member 33 makes contact with the lower surface of the top plate portion 61. The radial outer surface of the ring-shaped member 33 is fixed to the hub protrusion portion 62, e.g., by press fit or by an adhesive agent.

A lubricant 41 exists between the combination of the sleeve 23 and the cap 24 and the combination of the shaft 31, the hub 32 and the ring-shaped member 33. The liquid level of the lubricant 41 is positioned between the outer circumferential surface of the sleeve 23 and the inner circumferential surface of the ring-shaped member 33. The shaft 31, the hub 32 and the ring-shaped member 33 are rotatably supported with respect to the sleeve 23 and the cap 24 through the lubricant 41. In the present embodiment, the bearing mechanism 4 preferably includes: the sleeve 23 and the cap 24 which belong to the stationary unit 2; the shaft 31, the hub 32 and the ring-shaped member 33 which belong to the rotary unit 3; and the lubricant 41 existing therebetween. For example, polyol ester-based oil or diester-based oil is used as the lubricant 41.

A radial dynamic pressure groove array is provided on at least one of the inner circumferential surface of the sleeve 23 and the outer circumferential surface of the shaft 31. The radial dynamic pressure groove array is formed into, e.g., a herringbone shape. Upon driving the brushless motor 11, the radial dynamic pressure groove array induces a radial dynamic pressure in the lubricant 41 existing between the sleeve 23 and the shaft 31. The shaft 31 is radially supported with respect to the sleeve 23 by the dynamic pressure thus induced.

A thrust dynamic pressure groove array is provided on at least one of the upper surface of the sleeve 23 and the lower surface of the top plate portion 61. The thrust dynamic pressure groove array is formed into, e.g., a herringbone shape or a spiral shape. Upon driving the brushless motor 11, the thrust dynamic pressure groove array induces an axial dynamic pressure in the lubricant 41 existing between the sleeve 23 and the hub 32. The hub 32 is axially supported with respect to the sleeve 23 by the axial dynamic pressure thus induced.

The magnet 34 is fixed to the lower surface of the top plate portion 61 of the hub 32 by an adhesive agent. The magnet 34 of the present embodiment is formed into an annular shape and is arranged in a substantially coaxial relationship with the center axis 9. The magnet 34 is positioned above the armature 22. The lower surface of the magnet 34 is axially opposed to the coil patterns 223 arranged on the upper surface of the armature 22. The lower surface of the magnet 34 is alternately magnetized with N-poles and S-poles along the circumferential direction.

The rotor yoke 35 is a magnetic body rotating together with the hub 32 and the magnet 34. The rotor yoke 35 of the present embodiment preferably includes a cylinder portion 71 and a flange portion 72. The cylinder portion 71 is arranged radially inward of the armature 22 to axially extend in a substantially cylindrical shape. The cylinder portion 71 is fixed to the hub protrusion portion 62. The flange portion 72 extends radially outward from the lower end of the cylinder portion 71. The flange portion 72 is positioned below the armature 22, above the bottom plate portion 51 of the base member 21 and radially inward of the armature holding portion 54 of the base member 21. The flange portion 72 extends in a substantially annular shape. The upper surface of the flange portion 72 is axially opposed to the lower surface of the armature 22.

In the brushless motor 11 described above, magnetic fluxes axially penetrating the armature 22 are generated if a drive current is supplied to the coil patterns 223 via the power feeding portion 224. Also formed is a magnetic circuit extending through the armature 22, the magnet 34, the hub 32 and the rotor yoke 35. Circumferential torque is generated under the action of the magnetic fluxes. As a result, the rotary unit 3 is rotated about the center axis 9 with respect to the stationary unit 2. The magnetic disk 12 supported on the hub 32 is rotated about the center axis 9 together with the rotary unit 3.

Next, description will be made on the relationship between the hub 32 and the magnet 34.

Figure 6:
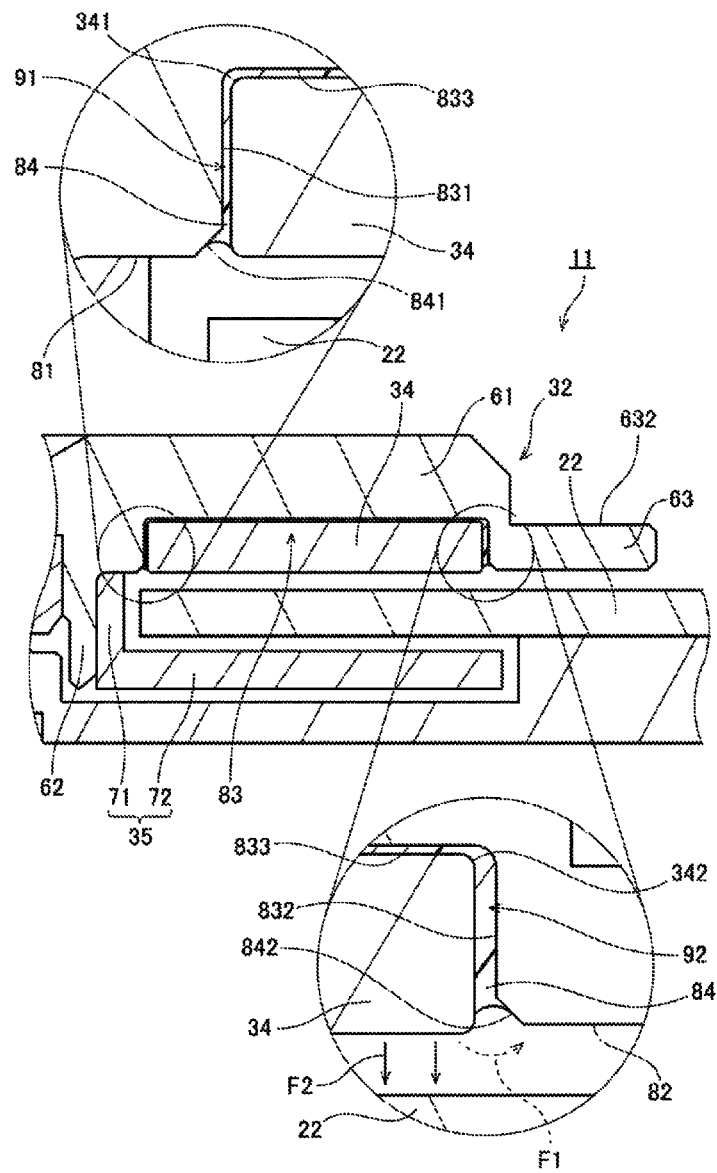
FIG. 6 is a partial vertical section view showing the brushless motor according to the second preferred embodiment.
Figure 7:
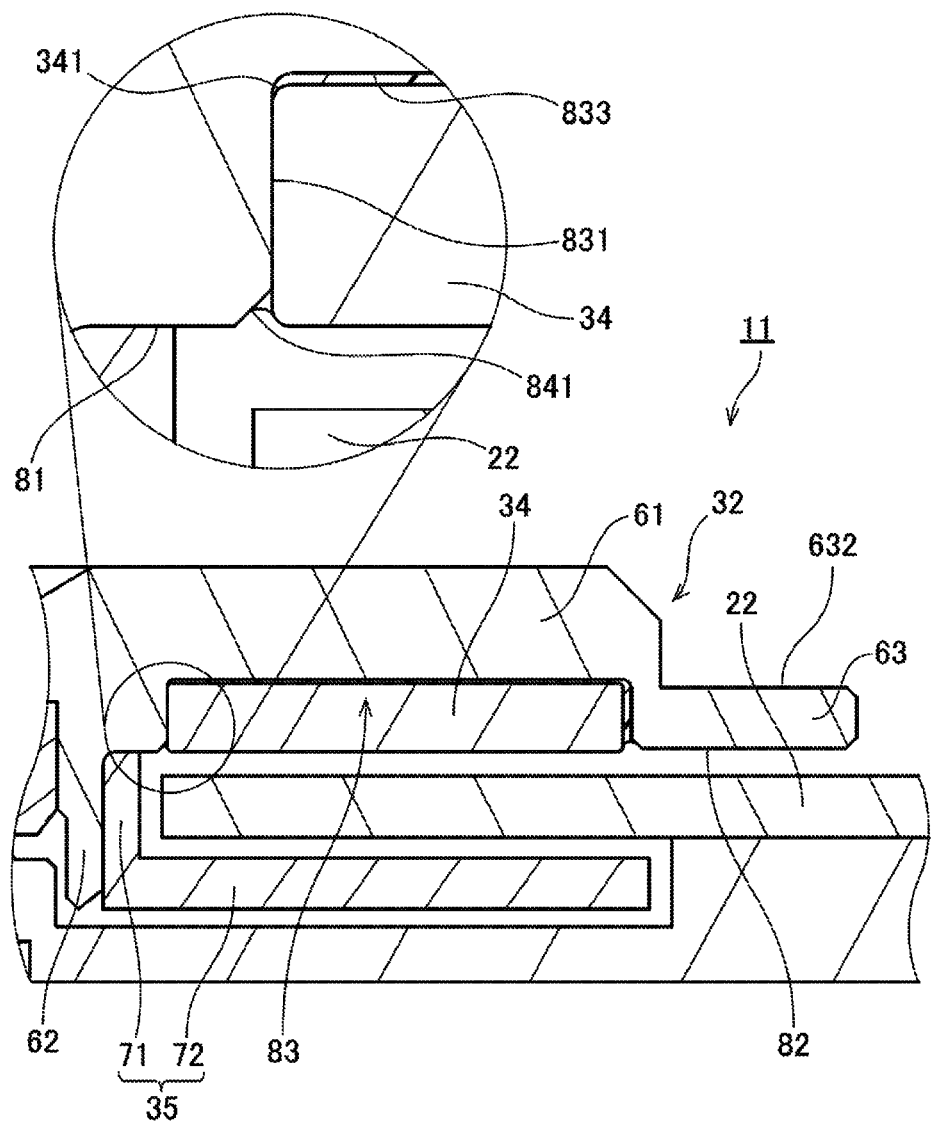
FIG. 7 is a partial vertical section view showing the brushless motor according to the second preferred embodiment.
Figure 8:
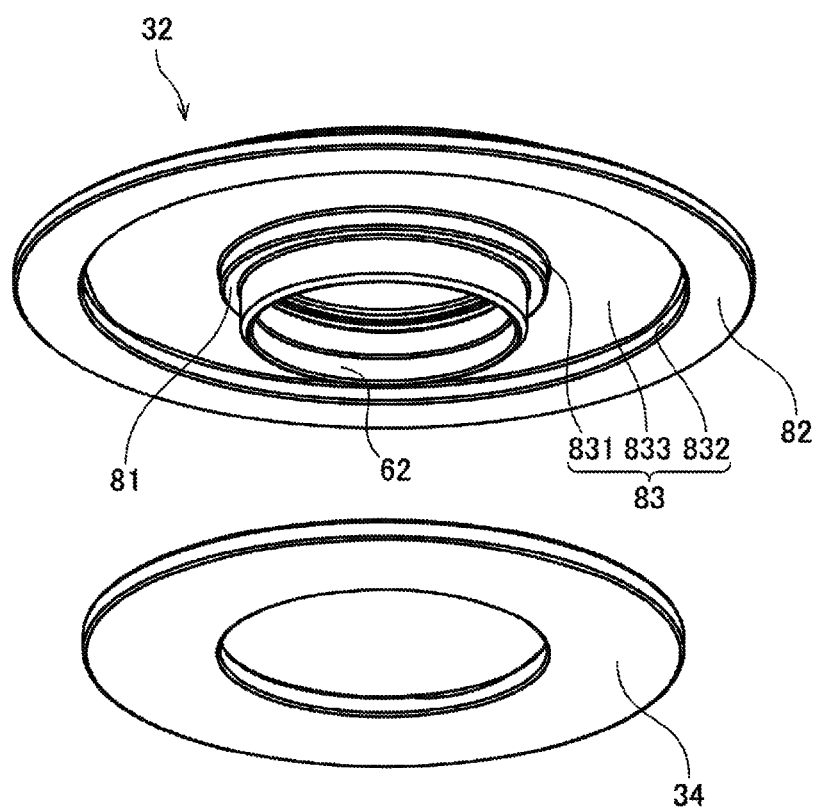
FIG. 8 is an exploded perspective view showing a hub and a magnet according to the second preferred embodiment.
Figure 9:
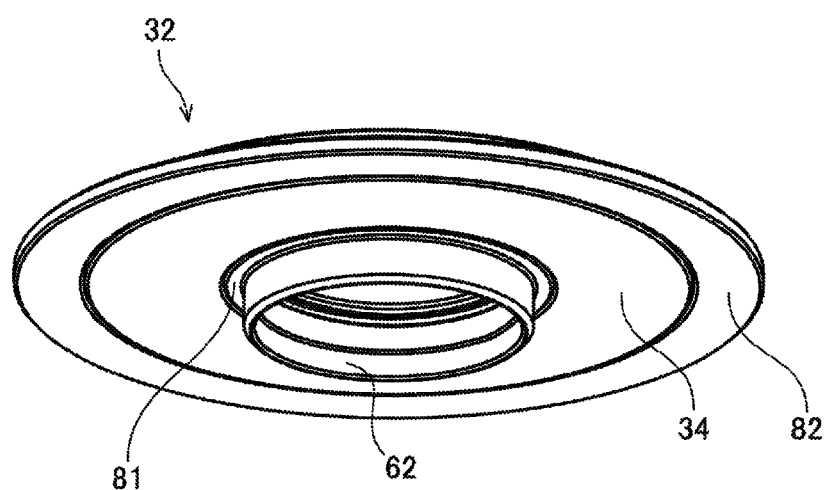
FIG. 9 is a perspective view showing the hub and the magnet according to the second preferred embodiment.

FIGS. 6 and 7 are partial vertical section views of the brushless motor 11. FIG. 8 is an exploded perspective view of the hub 32 and the magnet 34. FIG. 9 is a perspective view of the hub 32 and the magnet 34. FIGS. 6 and 7 show vertical cross sections taken in different circumferential positions.

As shown in FIGS. 6, 7, 8 and 9, the lower surface of the hub 32 preferably includes an inner lower surface 81, an outer lower surface 82 and a recess portion 83. The inner lower surface 81 is arranged radially inward of the magnet 34 and radially outward of the hub protrusion portion 62 so as to extend in the direction orthogonal to the center axis 9. The outer lower surface 82 is arranged radially outward of the magnet 34 so as to extend in the direction orthogonal to the center axis 9. The recess portion 83 is positioned between the inner lower surface 81 and the outer lower surface 82 and is depressed upward. In the present embodiment, the inner lower surface 81, the outer lower surface 82 and the recess portion 83 have a substantially annular shape when seen in a bottom view. The inner lower surface 81, the outer lower surface 82 and the recess portion 83 are arranged in a substantially coaxial relationship with the center axis 9.

At least a portion of the magnet 34 is accommodated within the recess portion 83. Thus, the upper surface of the magnet 34 is positioned above the inner lower surface 81 and the outer lower surface 82. In other words, the axial position of the magnet 34 partially overlaps with the axial position of the top plate portion 61. Therefore, the top plate portion 61 and the magnet 34 are restrained from becoming larger in the overall axial dimension. As a result, the brushless motor 11 is restrained from growing larger in the axial dimension.

In the present embodiment, as shown in FIGS. 6 and 7, the recess portion 83 is positioned radially inward of the disk support portion 63. In other words, the disk support portion 63 does not axially overlap with the recess portion 83. The central lower surface 833 and the upper surface of the magnet 34 are positioned above a second support surface 632. Therefore, the top plate portion 61, the disk support portion 63 and the magnet 34 are restrained from becoming larger in the overall axial dimension.

As shown in FIGS. 6, 7 and 8, the recess portion 83 includes an inner side surface 831, an outer side surface 832 and a central lower surface 833. The central lower surface 833 is arranged above the magnet 34 to extend in a disc-like shape. The upper surface of the magnet 34 is axially opposed to the central lower surface 833. The inner side surface 831 is positioned radially inward of the magnet 34. The inner side surface 831 extends downward from the inner circumferential portion of the central lower surface 833 in a substantially cylindrical shape. The inner side surface 831 is joined to the outer circumferential portion of the inner lower surface 81. The outer side surface 832 is positioned radially outward of the magnet 34. The outer side surface 832 has a substantially cylindrical shape and extends downward from the outer circumferential portion of the central lower surface 833. The outer side surface 832 is joined to the inner circumferential portion of the outer lower surface 82.

A magnetic attraction force is generated between the hub 32 and the magnet 34. As shown in FIGS. 6 and 7, an adhesive agent 84 exists between the magnet 34 and the recess portion 83. In the present embodiment, the magnet 34 is fixed to the hub 32 by the magnetic attraction force generated between the hub 32 and the magnet 34 and by the bonding force of the adhesive agent 84. Alternatively, the magnet 34 may be fixed to the hub 32 only by the magnetic attraction force without having to use the adhesive agent 84.

As microscopically shown in the right lower region in FIG. 6, a radial gap 92 extending over the entire circumference exists between the radial outer end surface of the magnet 34 and the outer side surface 832. In other words, the radial outer end surface of the magnet 34 does not make contact with the outer side surface 832. The radial outer end surface of the magnet 34 is radially opposed to the outer side surface 832 across the radial gap 92. For this reason, as compared with a case where the magnet makes contact with the outer side surface, magnetic fluxes are difficult to flow from the magnet 34 toward the outer side surface 832. As a result, the magnetic fluxes can efficiently flow from the magnet 34 toward the armature 22.

As microscopically shown in the right lower region in FIG. 6, the lower end of the outer side surface 832 and the outer lower surface 82 are positioned above the lower surface of the magnet 34. For this reason, as compared with a case where the axial position of the lower end of the outer side surface or the outer lower surface is equal to or lower than the axial position of the lower surface of the magnet, magnetic fluxes are difficult to flow from the magnet 34 toward the outer lower surface 82. In other words, as microscopically shown in the right lower region in FIG. 6, the amount of magnetic fluxes F1 indicated by a broken line arrow is decreased. As a result, the magnetic fluxes can efficiently flow from the magnet 34 toward the armature 22. In other words, as microscopically shown in the right lower region in FIG. 6, the amount of magnetic fluxes F2 indicated by solid line arrows is increased.

In the present embodiment, as microscopically shown in the left upper region in FIG. 6, the axial position of the inner lower surface 81 and the axial position of the lower surface of the magnet 34 are set substantially equal to each other. When the magnet 34 is attached to the hub 32, the magnet 34 is axially located in position on the basis of the inner lower surface 81. Accordingly, the axial distance between the lower surface of the magnet 34 and the upper surface of the armature 22 is accurately decided.

As microscopically shown in the left upper region in FIG. 6, the radial inner end surface of the magnet 34 is radially opposed to the inner side surface 831 across a gap 91 in some circumferential positions. In addition, as microscopically shown in the left upper region in FIG. 7, the radial inner end surface of the magnet 34 makes contact with the inner side surface 831 in other circumferential positions. In other words, the radial inner end surface of the magnet 34 makes contact with a portion of the inner side surface 831 in the circumferential direction. Thus, the magnet 34 is radially located in position.

In the present embodiment, the radial distance between the radial outer end surface of the magnet 34 and the outer side surface 832 is larger than the radial distance between the radial inner end surface of the magnet 34 and the inner side surface 831. The axial position of the outer lower surface 82 is higher than the axial position of the inner lower surface 81. Accordingly, the flow of the magnetic fluxes from the lower surface of the magnet 34 toward the hub 32 is more heavily restrained in the outer circumferential portion of the magnet 34 than in the inner circumferential portion of the magnet 34.

The adhesive agent 84 exists between the upper surface of the magnet 34 and the central lower surface 833. As microscopically shown in the left upper region in FIG. 6, a part of the adhesive agent 84 exists in the gap 91 between the radial inner end surface of the magnet 34 and the inner side surface 831. As microscopically shown in the right lower region in FIG. 6, another part of the adhesive agent 84 exists in the gap 92 between the radial outer end surface of the magnet 34 and the outer side surface 832. This increases the fixing strength of the magnet 34 with respect to the hub 32.

The adhesive agent 84 may not necessarily exist in both the gap 91 and the gap 92. In other words, the adhesive agent 84 may exist in only one of the gaps 91 and 92. If the lower end portion of the adhesive agent 84 is extruded more downward than the lower surface of the magnet 34, there is likelihood that the adhesive agent 84 makes contact with the upper surface of the armature 22. For this reason, it is preferred that the lower end portion of the adhesive agent 84 be positioned above the lower surface of the magnet 34.

In the present embodiment, as microscopically shown in the left upper region in FIG. 6 and in left upper region in FIG. 7, the inner side surface 831 preferably includes an inner joining surface 841. The inner joining surface 841 is positioned in the lower end portion of the inner side surface 831. The lower end portion of the inner joining surface 841 is joined to the outer circumferential portion of the inner lower surface 81. The outer diameter of the inner joining surface 841 becomes smaller downward. For this reason, the radial distance between the inner joining surface 841 and the radial inner end surface of the magnet 34 grows larger downward.

In the present embodiment, as microscopically shown in the right lower region in FIG. 6, the outer side surface 832 preferably includes an outer joining surface 842. The outer joining surface 842 is positioned in the lower end portion of the outer side surface 832. The lower end portion of the outer joining surface 842 is joined to the inner circumferential portion of the outer lower surface 82. The inner diameter of the outer joining surface 842 becomes larger downward. For this reason, the radial distance between the outer joining surface 842 and the radial outer end surface of the magnet 34 grows larger downward.

When the magnet 34 is attached to the recess portion 83 of the hub 32, the magnet 34 is inserted into the recess portion 83 along the inner joining surface 841 and the outer joining surface 842. This makes it easy to insert the magnet 34 into the recess portion 83. Even if the uncured adhesive agent 84 is spread around the lower end portions of the gaps 91 and 92, upward surface tensions act on the adhesive agent 84 in the vicinity of the inner joining surface 841 and in the vicinity of the outer joining surface 842. This restrains the adhesive agent 84 from protruding more downward than the lower surface of the magnet 34.

As in the present embodiment, each of the inner joining surface 841 and the outer joining surface 842 may be a slant surface having a rectilinear shape in a vertical cross section. Alternatively, each of the inner joining surface 841 and the outer joining surface 842 may be a curved surface having a round shape in a vertical cross section. One or both of the inner joining surface 841 and the outer joining surface 842 may be omitted.

In the present embodiment, as microscopically shown in the left upper region in FIG. 6 and in left upper region in FIG. 7, the radial inner end surface of the magnet 34 preferably includes an inner chamfered portion 341. The inner chamfered portion 341 is positioned in the upper end portion of the radial inner end surface of the magnet 34. The upper end portion of the inner chamfered portion 341 is joined to the inner circumferential portion of the upper surface of the magnet 34. The radius of curvature of the inner chamfered portion 341 becomes larger upward. For this reason, the radial distance between the inner side surface 831 and the inner chamfered portion 341 grows larger upward.

In the present embodiment, as microscopically shown in the right lower region in FIG. 6, the radial outer end surface of the magnet 34 preferably includes an outer chamfered portion 342. The outer chamfered portion 342 is positioned in the upper end portion of the radial outer end surface of the magnet 34. The upper end portion of the outer chamfered portion 342 is joined to the outer circumferential portion of the upper surface of the magnet 34. The radial distance between the outer side surface 832 and the outer chamfered portion 342 becomes larger upward.

When the magnet 34 is attached to the recess portion 83 of the hub 32, the inner chamfered portion 341 or the outer chamfered portion 342 comes into contact with the hub 32, whereby the magnet 34 is radially located in position. This makes it easy to insert the magnet 34 into the recess portion 83. The adhesive agent 84 is accumulated in the space between the inner chamfered portion 341 and the recess portion 83 and in the space between the outer chamfered portion 342 and the recess portion 83. Thus, the magnet 34 is strongly bonded to the recess portion 83.

As in the present embodiment, each of the inner chamfered portion 341 and the outer chamfered portion 342 may be a curved surface having a round shape in a vertical cross section. Alternatively, each of the inner chamfered portion 341 and the outer chamfered portion 342 may be a slant surface having a rectilinear shape in a vertical cross section. One or both of the inner chamfered portion 341 and the outer chamfered portion 342 may be omitted.

In the present embodiment, as shown in FIGS. 6, 7, 8 and 9, the radial length of the inner lower surface 81 is shorter than the radial length of the outer lower surface 82. Thus, the radial position of the magnet 34 comes closer to the center axis 9. If the radial position of the magnet 34 comes closer to the center axis 9, it is possible to reduce the overall radial dimension of the brushless motor 11.

In the present embodiment, as shown in FIGS. 6, 7, 8 and 9, the hub protrusion portion 62 is positioned radially inward of the inner lower surface 81. In other words, the inner lower surface 81 exists between the magnet 34 and the hub protrusion portion 62. Therefore, as compared with a case where the inner lower surface 81 is absent, the magnet 34 and the hub protrusion portion 62 are radially spaced apart from each other. This reduces the amount of magnetic fluxes flowing from the magnet 34 toward the hub protrusion portion 62. As a result, the magnetic fluxes can efficiently flow from the magnet 34 toward the armature 22.

In the present embodiment, as shown in FIGS. 6 and 7, the upper end portion of the cylinder portion 71 of the rotor yoke 35 makes contact with the inner lower surface 81. Thus, the rotor yoke 35 is axially located in position. The outer circumferential surface of the cylinder portion 71 is positioned radially inward of the radial inner edge portion of the recess portion 83. This reduces the amount of magnetic fluxes flowing from the magnet 34 toward the cylinder portion 71. As a result, the magnetic fluxes can efficiently flow from the magnet 34 toward the armature 22. If the cylinder portion 71 is positioned radially inward of the recess portion 83, the armature 22 is also arranged radially inward in proportion thereto. This makes it possible to further reduce the overall radial dimension of the brushless motor 11.

While illustrative embodiments of the present invention have been described above, the present invention is not limited to the aforementioned embodiments.

Figure 10:
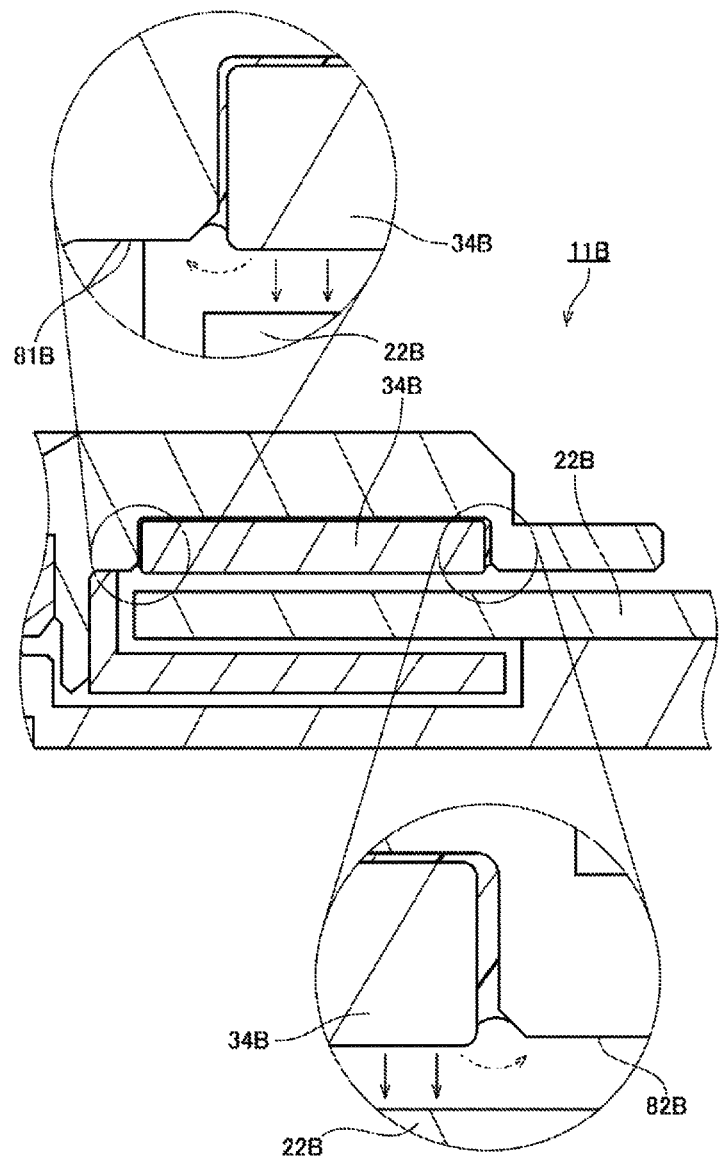
FIG. 10 is a partial vertical section view of a brushless motor according to one modified example.

FIG. 10 is a partial vertical section view of a brushless motor 11B according to one modified example. In this modified example, as microscopically shown in the left upper region and the right lower region in FIG. 10, the inner lower surface 81B and the outer lower surface 82B are positioned above the lower surface of the magnet 34B. This makes it possible to reduce the amount of magnetic fluxes flowing from the magnet 34B toward the inner lower surface 81B and the amount of magnetic fluxes flowing from the magnet 34B toward the outer lower surface 82B. Accordingly, the magnetic fluxes can efficiently flow from the magnet 34B toward the armature 22B.

In other words, if at least one of the inner lower surface and the outer lower surface is positioned above the lower surface of the magnet, the amount of magnetic fluxes flowing from the magnet toward the upwardly positioned surface becomes lower than when the axial position of the upwardly positioned surface is equal to or lower than the axial position of the lower surface of the magnet. Accordingly, the amount of magnetic fluxes flowing from the magnet toward the armature is increased.

Figure 11:
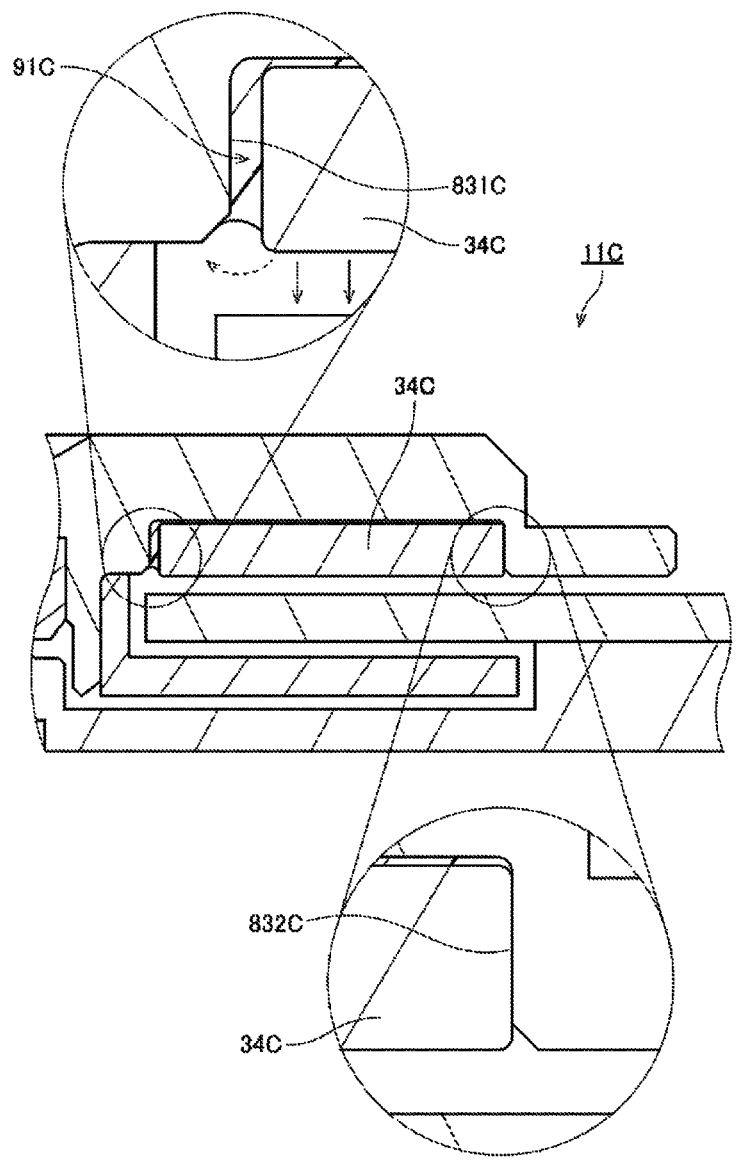
FIG. 11 is a partial vertical section view of a brushless motor according to another modified example.

FIG. 11 is a partial vertical section view of a brushless motor 11C according to another modified example. In this modified example, as microscopically shown in the left upper region in FIG. 11, a radial gap 91C exists between the radial inner end surface of the magnet 34C and the inner side surface 831C over the entire circumference. In other words, the radial inner end surface of the magnet 34C does not make contact with the inner side surface 831C. The radial inner end surface of the magnet 34C is radially opposed to the inner side surface 831C across a gap 91C. For this reason, as compared with the structure of the second embodiment, the amount of magnetic fluxes flowing from the magnet 34C toward the inner side surface 831C becomes smaller.

In this modified example, as microscopically shown in the right lower region in FIG. 11, at least a portion of the radial outer end surface of the magnet 34C makes contact with the outer side surface 832C. Thus, the magnet 34C is radially located in position.

In other words, if a radial gap exists in at least one of a space between the radial inner end surface of the magnet and the inner side surface and a space between the radial outer end surface of the magnet and the outer side surface, the amount of magnetic fluxes flowing from the magnet toward the hub becomes smaller than when the radial gap is absent. Accordingly, the amount of magnetic fluxes flowing from the magnet toward the armature is increased.

Figure 12:
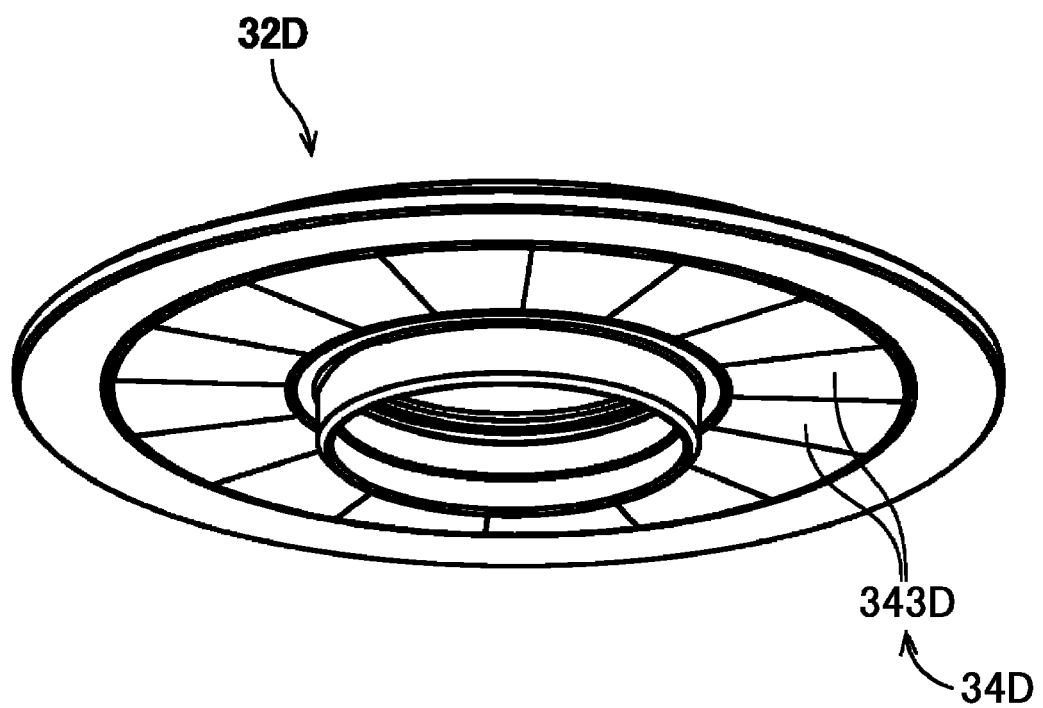
FIG. 12 is a perspective view showing a hub and a magnet according to a further modified example.

FIG. 12 is a perspective view of a hub 32D and a magnet 34D according to a further modified example. In the modified example shown in FIG. 12, the magnet 34D preferably includes a plurality of segment magnets 343D arranged along the circumferential direction. The lower surfaces of the respective segment magnets 343D are magnetic pole surfaces axially opposed to the upper surface of the armature. The segment magnets 343D are arranged along the circumferential direction such that magnetic pole surfaces having an N-pole and magnetic pole surfaces having an S-pole are alternately arranged side by side. This helps simplify the shape of the respective segment magnets 343D. Accordingly, the respective segment magnets 343D can be formed with ease. However, if a single annular magnet 34 is used as in the second embodiment, it becomes easier to install and locate the magnet 34.

The brushless motor according to the preferred embodiments may be a so-called fixed-shaft-type motor in which a shaft belongs to a stationary unit and a sleeve belongs to a rotary unit. The preferred embodiments of the present invention can be used in, e.g., a brushless motor and a disk drive apparatus. The brushless motor and the disk drive apparatus according to the preferred embodiments may be used to rotate a disk other than the magnetic disk, e.g., an optical disk.

The specific shapes of the respective members may differ from those shown in the respective figures of the subject application.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A brushless motor, comprising:
   a stationary unit; and
   a rotary unit rotatably supported with respect to the stationary unit,
   wherein the stationary unit includes a flat armature arranged to extend in a direction orthogonal to a center axis extending in an up-down direction and a base member arranged to support the armature,
   the rotary unit includes a magnet positioned above the armature, a hub made of a magnetic material and arranged to hold the magnet, and a rotor yoke made of a magnetic material and provided with a portion positioned below the armature,
   the armature includes a plurality of coil patterns arranged along a circumferential direction, and
   the hub includes an inner lower surface positioned radially inward of the magnet, an outer lower surface positioned radially outward of the magnet, and a recess portion arranged between the inner lower surface and the outer lower surface and depressed upward, at least a portion of the magnet accommodated within the recess portion, at least one of the inner lower surface and the outer lower surface positioned above a lower surface of the magnet.

2. The brushless motor of claim 1, wherein the inner lower surface, the outer lower surface, the recess portion and the magnet are formed into a substantially annular shape and are arranged in a substantially coaxial relationship with the center axis.

3. The brushless motor of claim 1, wherein the magnet includes a plurality of segment magnets arranged along the circumferential direction.

4. The brushless motor of claim 1, wherein an adhesive agent exists between the recess portion and the magnet.

5. The brushless motor of claim 4, wherein the adhesive agent includes a lower end portion positioned above the lower surface of the magnet.

6. The brushless motor of claim 1, wherein the recess portion includes a central lower surface opposed to an upper surface of the magnet, an inner side surface arranged to extend downward from an inner circumferential portion of the central lower surface and joined to an outer circumferential portion of the inner lower surface, and an outer side surface arranged to extend downward from an outer circumferential portion of the central lower surface and joined to an inner circumferential portion of the outer lower surface, at least one of the inner side surface and the outer side surface including a joining surface, a radial distance between the joining surface and the magnet becoming larger downward.

7. The brushless motor of claim 1, wherein the recess portion includes a central lower surface opposed to an upper surface of the magnet, an inner side surface arranged to extend downward from an inner circumferential portion of the central lower surface and joined to an outer circumferential portion of the inner lower surface, and an outer side surface arranged to extend downward from an outer circumferential portion of the central lower surface and joined to an inner circumferential portion of the outer lower surface, at least one of a radial inner end surface of the magnet and a radial outer end surface of the magnet including a chamfered portion, a radial distance between the chamfered portion and the inner side surface or the outer side surface radially opposed to the chamfered portion becoming larger upward.

8. The brushless motor of claim 1, wherein the recess portion includes a central lower surface opposed to an upper surface of the magnet, an inner side surface arranged to extend downward from an inner circumferential portion of the central lower surface and joined to an outer circumferential portion of the inner lower surface, and an outer side surface arranged to extend downward from an outer circumferential portion of the central lower surface and joined to an inner circumferential portion of the outer lower surface, a radial distance between a radial outer end surface of the magnet and the outer side surface being larger than a radial distance between a radial inner end surface of the magnet and the inner side surface, the outer lower surface positioned above the inner lower surface.

9. The brushless motor of claim 1, wherein an axial position of the inner lower surface is substantially equal to an axial position of the lower surface of the magnet.

10. The brushless motor of claim 1, wherein the inner lower surface and the outer lower surface are positioned above the lower surface of the magnet.

11. The brushless motor of claim 1, wherein a radial length of the inner lower surface is shorter than a radial length of the outer lower surface.

12. The brushless motor of claim 1, wherein the hub further includes a hub protrusion portion arranged radially inward of the inner lower surface to extend downward, the rotor yoke including a cylinder portion fixed to the hub protrusion portion and a flange portion extending radially outward from the cylinder portion and having an upper surface axially opposed to a lower surface of the armature, the cylinder portion including an upper end portion making contact with the inner lower surface.

13. The brushless motor of claim 12, wherein an outer circumferential surface of the cylinder portion is positioned radially inward of a radial inner edge portion of the recess portion.

14. A disk drive apparatus, comprising:
the brushless motor of claim 1;
an access unit arranged to perform at least one of information reading and writing tasks with respect to a disk supported on the rotary unit of the brushless motor; and
a cover making up a housing in cooperation with the base member, the rotary unit and the access unit accommodated within the housing.

* * * * *